United States Patent Office 2,763,086
Patented Sept. 18, 1956

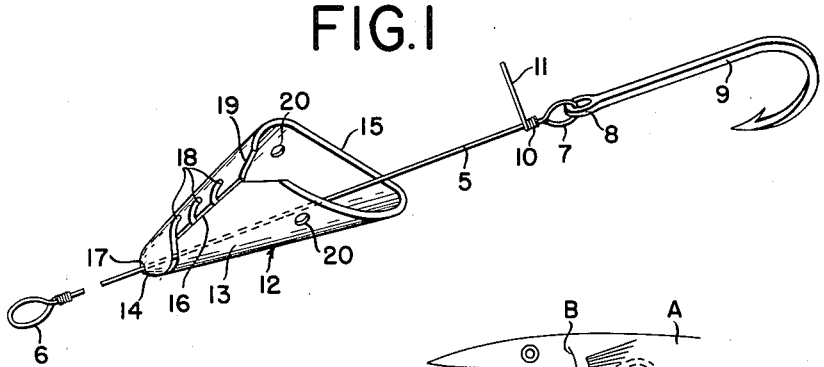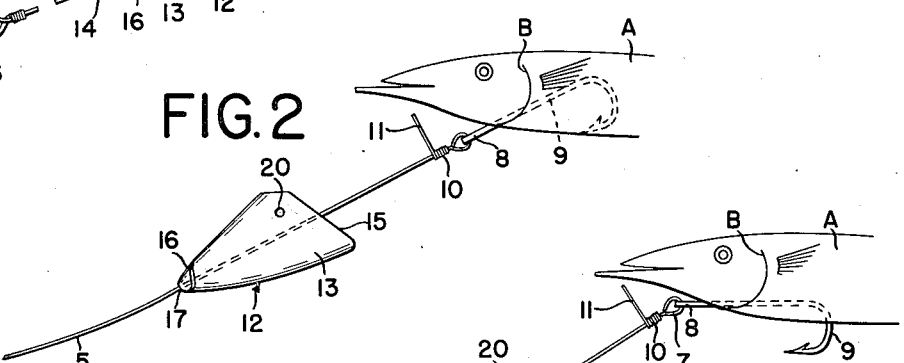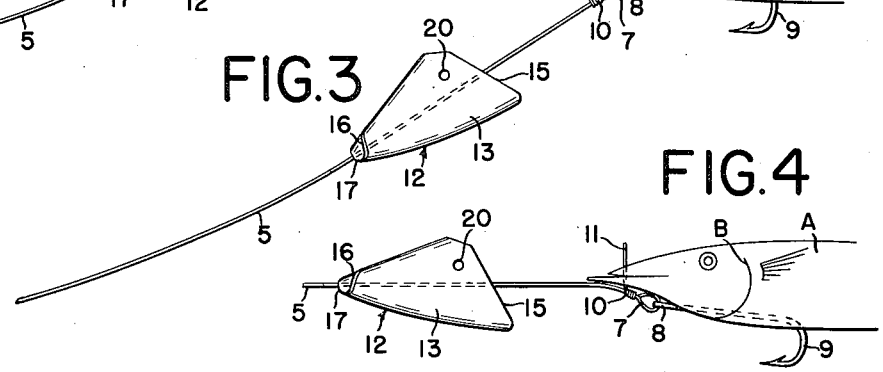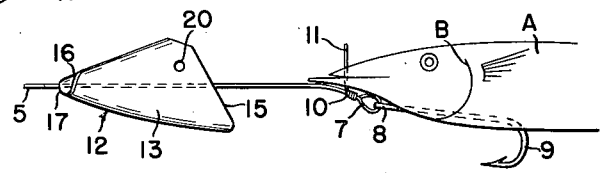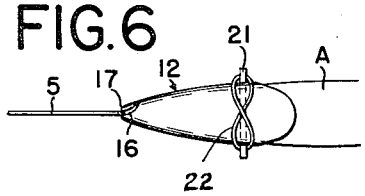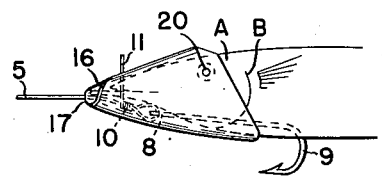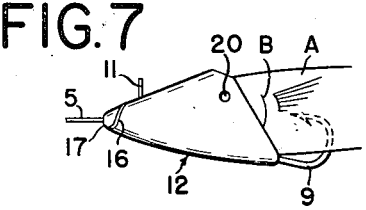

2,763,086

MEANS FOR CONNECTING A NATURAL BAIT LURE

Frederick W. Johnson and Carol E. Chance, Fort Lauderdale, Fla.

Application March 19, 1956, Serial No. 572,539

5 Claims. (Cl. 43—44.2)

This invention relates to improvements in means for attaching a conventional fish hook and leader to a natural bait lure.

The invention contemplates a conventional trolling leader equipped with a standard hook in combination with a readily detachable head piece whereby to comprise a rig for quick and easy attachment to the fish and with the head piece snugly engaging over the head of the fish and with the rig being locked with respect to the head to prevent accidental disengagement.

The standard and well known method of rigging a leader and hook to a natural lure has been time consuming and difficult since, after the hook has been engaged with the lure, it has been customary to wrap the head of the lure, being careful to also pass the wrappings over the eyes to prevent bulging in use and destroy the natural swimming motion of the fish in trolling. All of the above requires a considerable amount of time, and should the lure be bit in half however by a striking fish, it then becomes necessary to cut away the wrapping in order to detach the hook for purpose of employing a fresh lure.

The device of the present invention avoids all of the above undesirable features of standard attaching means and provides a rig embodying a leader wire and standard hook and with the leader wire at its point of connection with the hook being twisted in a conventional manner and with a free end terminating in an upstanding pin that is employed to be forced upwardly entirely through both jaws of the lure to project above the upper jaw and a head piece or hood that is engageable upon the leader to be shifted into overlying engagement with the head of the lure and also having interlocking engagement with the upstanding pin to thus hold the head piece against a reverse movement.

The invention further contemplates a head piece that conforms to the head of the natural bait lure and to extend sufficiently toward the body of the fish whereby to completely cover the eyes.

The device is unique, in that the standard hook and leader wire arrangement will not have to be altered and the head piece can be made to conform to any natural bait lure, regardless of the shape of the fish such as eels, balao, mullet, and even blood and sand worms used for trolling and casting. The adjustable head piece eliminates any additional hardware such as swivels, a chain, and prongs. It also eliminates any bulky attachments either inside the lure or outside the lure, thereby giving the lure the appearance of a natural fish swimming through the water.

Novel features of construction and operation of the device will be more clearly apparent during the course of the following description, reference being had to the accompanying drawings wherein has been illustrated a preferred form thereof.

In the drawings:

Figure 1 is a perspective view of a rig constructed in accordance with the invention, Figure 2 is a fragmentary side elevation illustrating the initial engagement of the hook with the fish, Figure 3 is a fragmentary side elevation illustrating the full engagement of the hook with respect to the lure, Figure 4 is a fragmentary side elevation illustrating the complete engagement of the hook and the piercing pin of the leader, Figure 5 is a fragmentary side elevation showing the rig completely assembled with respect to the lure and with the head piece in interlocking engagement with the pin and in overlying relation to the head of the lure, Figure 6 is a fragmentary bottom plan view of the completely assembled rig illustrating a locking pin passed entirely through the eyes of the lure and through the side walls of the head piece and Figure 7 is a fragmentary side elevation showing the engagement of the hook with the lure in a reverse direction whereby to provide a weedless lure.

Referring specifically to the drawings, the numeral 5 designates a conventional wire leader having a forward eye 6 and an eye 7 that has been engaged through the eye 8 of the shank portion of a conventional barbed hook 9. The shaping of the eye 7 is performed in the usual manner by first passing the leader through the eye of the hook and then winding the free end of the leader as at 10, leaving an upstanding end portion 11. The end portion 11 will constitute a locking pin, for a purpose to be presently described.

Detachably engageable upon the leader wire 5, is a hood or head piece indicated as a whole by the numeral 12. The head piece is preferably formed of plastic, though not necessarily restricted to such a material and embodies a generally cone-shaped body 13, having a relatively closed reduced end 14 and a flaring open mouth portion 15. The hood 12 is shaped transversely in generally an oval manner corresponding to the shape of the head of a bait fish, such as balao, mullet or the like. The upper wall of the body 13 is longitudinally slotted at 16 and with the slot at the forward or reduced end of the device being curled around the reduced end to terminate in a co-axial aperture 17. A plurality of rearwardly angled locking notches 18 are formed in the head 13 and communicate with the slot 16, to function in a manner as will presently be described. The marginal edge of the flaring open end 15 has been notched as at 19 to facilitate the entry of the pin 11 into the slot 16 when the device is assembled with respect to the bait fish. With the slot 16 and the curled extension thereof to the aperture 17, the hood 12 may be engaged or disengaged upon the leader wire 5 without the necessity of first threading the same thereon before the formation of the eye 6 or the eye 7. This manner of connection permits the user to make up a plurality of conventional trolling leaders and then to engage the hood 12 upon such leaders as are required to furnish trolling rigs. The hood 12 adjacent its flaring open end 15 has been transversely apertured at 20 for the reception of an anchor pin 21 that additionally serves to anchor the rig with respect to the bait fish and, it is contemplated that the apertures 20 are so arranged with respect to a bait fish as to register with the eyes of the fish upon opposite sides when the device is in fully assembled relation.

As before pointed out the device constitutes a rig assembly whereby to securely lock the trolling rig with respect to the bait fish against accidental displacement yet permits of the device to be readily disengaged by the operator should a striking fish sever the bait back to a point adjacent the hook, thus destroying the bait as a lure.

In the use of the device, there has been fragmentarily shown the forward portion of a natural lure, such as the balao and, as will be recognized by persons familiar with fishing, that the relatively long bill of the balao must be broken off adjacent the upper jaw, it being understood that the bill extends from the lower jaw. Now, with the fish (A) being held in the manner shown at Figure 2, the operator inserts the hook 9 behind the gill plates (B) of the fish, forcing the hook into the stomach portion to a predetermined degree or, until the pin 11 is in a position to be forced upwardly through the jaws of the fish. The hook is then forced downwardly through the belly of the fish to project therefrom as illustrated in Figure 3. The operator then forces the pin 11 upwardly through both jaws of the fish to extend above the upper jaw as illustrated in Figure 4. This engagement of the pin 11 holds the rig against longitudinal shifting with respect to the fish. Now, with the pin in the position of Figure 4, the hood 12 is shifted forwardly upon the leader wire 5, engaging over the head of the fish, backward to a point where the eye 7 and 8 and the wrapping 10 is snugly engaged against the underjaw of the fish and with the hood overlying the eyes of the fish and also securely preventing lateral motion of the gill plates. As the hood 12 is engaged over the head of the fish, the pin 11 enters the slot 16 through the notch 19 and the hood is then forced into a snug engagement with the head of the fish to a degree where the pin 11 has snapping engagement into either one of the notches 18. It will therefore be apparent that with the pin 11 locking the hook 9 against movement longitudinally, the hood 12 will securely lock the pin 11 against displacement and will maintain the eyes 7 and 8 and the shank of the hook in a proper angularity with respect to the fish in the usual trolling action. While the interlocking of the pin 11 will securely retain the rig in assembled relation with respect to the fish, additional locking means may be employed whereby a pin 21 may be forced through the apertures 20 and through the eyes and head of the fish to project upon opposite sides of the hood. A rubber band 22 or the like may be engaged over the extended ends of the pin 21, see Figure 6. With the device in a fully assembled relation as in Fiure 5, to disengage the rig from the fish, it only becomes necessary to flex the pin 11 to a point where it disengages a particular notch 18, to enter the slot 16 and in such position the hood 12 may be moved away from the head of the fish. This quick and easy disassembly is obviously essential when the natural lure has been partially destroyed by a striking fish. Obviously, the pin 21 would be first removed should the same be in use. The hood 12 is then shifted along the leader 5, permitting the hook 9 to be disengaged from the partially destroyed lure in the usual and well known manner. The upstanding pin 11 is sufficiently long as to constitute a substantially weedless lure, however, where a completely weedless lure is desirable, the hook after being extended through the gill plates as before is passed downwardly through the belly of the fish as before and then the hook is inverted and its barbed end forced into the belly, as illustrated in Figure 7. It should be understood, that when the hook is to be inverted to form a weedless lure, the pin 11 will be given an extra twist so as to be in a position to project upward to engage through the jaws of the fish. Thus, with the upstanding pin 11 and the inverted hook 9, the device is wholly weedless.

It will be apparent from the foregoing that an extremely simple and highly effective rig attaching means has been provided. The head piece, while preferably being of plastic material may also be formed of light weight metal such as aluminum and the same may be shaped transversely in accordance with the particular lure to be employed and may be formed in various colors. The hood 12 is quickly and easily engaged with the leader wire without disturbing the assembly of the leader and this is an especially valuable feature in that the hood is transferable from one leader to another. The simplicity of the head piece allows even the novice fisherman to rig up a life-like bait. The slot arrangement allows the head piece to be placed on the leader wire in seconds without removing either the hook or the loop end of the leader. The multiple notches allows the angler to place the pin in the desired notch of his choice for proper trolling or casting action. It also makes the lure weedless at the head and can be wholly weedless by inverting the hook. The head piece can be trolled at a slow speed or a fast speed without spinning inasmuch as the lure goes through the water much the same as a natural fish swims with no twists or humps of the lure. This is possible due to the fact that the eyes of the fish are completely covered, this being necessary, since after a bait has been in the water for a relatively short time, the eyes begin to bulge and cause the fish to spin as it is being trolled through the water. The rig is extremely cheap to manufacture, is strong, durable, highly effective in use and is safe to handle.

It is to be understood, that while a preferred example of the invention has been illustrated and described, changes are contemplated as readily fall within the spirit of the invention as shall be determined by the scope of the subjoined claims.

Having described our invention, what we claim as new and desire to secure by Letters Patent is:

1. Means for connecting a trolling leader to a natural bait lure, comprising a barbed hook, a leader wire that is connected at one end to said barbed hook and with its opposite end bent to form a line attaching eye, the leader at its point of connection with the hook being extended and bent to form an upstanding piercing pin that is adapted to be passed upwardly through the jaws of the lure to project thereabove, a hood detachably engageable with the leader for sliding movement therealong, the hood being shaped to conform to and overlie the head of the lure, and means formed upon the hood whereby to have interlocking engagement with the upwardly projecting pin and whereby to secure the hood against accidental movement.

2. Means for connecting a trolling leader and a barbed hook to a natural bait lure and whereby the hook is engaged through the gill plate of the lure to extend into the lure and with the barbed end of the hook projecting below the belly, the leader embodying a length of wire that is connected to a shank end of the hook and with the wire at its point of connection being twisted to leave a free end that constitutes a piercing pin and with the pin being upstanding in a direction opposite to the barbed end of the hook, the pin in the fully engaged position of the hook directly underlying and adapted to be forced upwardly through the jaws of the lure to project thereabove and whereby to anchor the leader and the hook against longitudinal shifting, and a hood device of generally conical form that is slidable upon the leader wire to snugly engage and overlie the head of the lure to a point that overlies the eyes of the lure, the hood being transversely and longitudinally shaped to conform to the contour of the head of the lure, the hood being longitudinally slotted for the reception of the pin as the hood engages the head of the lure, the hood being provided with lateral notches that receive the pin when the hood is in fully seated position and whereby to lock the hood against a reverse movement with respect to the lure, and the hood in the engaged and locked position serving to prevent a disengagement of the pin with respect to the jaws.

3. A trolling device including a barbed hook and a leader comprising a length of wire that is bent at one end to form a line attaching eye and at its opposite end is threaded through the shank eye of said barbed hook, the leader at its point of connection with the hook being twisted and with its terminal end left upstanding to form a piercing pin, and a light weight hood that is detachably engaged with the leader wire to be slidable thereon toward and from a head portion of a natural bait lure to which the leader and associated hook is to be attached, the hood being generally conical and having a closed reduced end and an open widely flaring mouth portion, the hood being shaped transversely and longitudinally to generally conform to the contour of the head portion of the lure and with the hood having a length sufficient to overlie the eyes of the lure when engaged thereon, the upper wall portion of the hood being longitudinally slotted and with the slot opening to the flaring mouth, the said slot being extended toward the reduced end of the hood to terminate in an axially arranged aperture whereby to receive the wire leader, said hood having lateral angled notches communicating with said slot at spaced apart points in its length, and said notches having a snapping engagement with the pin when the hood is assembled upon the lure.

4. The device according to claim 3, wherein the opposite side walls of the hood adjacent the flaring mouth are apertured and with the apertures being positioned at points substantially overlying the eyes of the lure when the hood is fully engaged with the lure, a pin adapted to be passed through the apertures to extend entirely through the head of the lure to project beyond the opposite sides of the hood and whereby to lock the hood against shifting movement with respect to the lure and a tie device looped across the hood to simultaneously engage the extended ends of the last-mentioned pin to prevent displacement of the last-mentioned pin.

5. The device according to claim 3, wherein the extended slot toward the reduced end of the hood is spirally curled around the hood to terminate in the axially arranged aperture.

No references cited.